US006966942B2

United States Patent
Broadbent

(10) Patent No.: US 6,966,942 B2
(45) Date of Patent: Nov. 22, 2005

(54) PROCESS FOR PURIFYING EXHAUST GASES BY EMPLOYING A BUBBLE GENERATOR

(76) Inventor: Alan Hyrun Broadbent, 13025 S. 5200 W., Santaquin, UT (US) 84655

( * ) Notice: Subject to any disclaimer, the term of this patent is extended or adjusted under 35 U.S.C. 154(b) by 34 days.

(21) Appl. No.: 10/371,208

(22) Filed: Feb. 24, 2003

(65) Prior Publication Data

US 2003/0177904 A1 Sep. 25, 2003

Related U.S. Application Data

(60) Provisional application No. 60/358,516, filed on Feb. 22, 2002.

(51) Int. Cl.[7] ............................................. B01D 47/02
(52) U.S. Cl. ............................ 95/64; 95/154; 95/226; 96/52; 96/235; 96/297
(58) Field of Search .......................... 95/154, 226, 63, 95/64, 150, 187, 188, 189; 96/235, 52, 74, 272, 279, 297

(56) References Cited

U.S. PATENT DOCUMENTS

| 3,650,091 | A | * | 3/1972 | Li ................................ 95/150 |
| 4,000,992 | A | * | 1/1977 | Cole, Jr. ...................... 95/150 |
| 4,155,977 | A | | 5/1979 | Baker |
| 4,193,774 | A | * | 3/1980 | Pilat ............................. 95/71 |
| 4,393,815 | A | | 7/1983 | Pedersen et al. |
| 5,039,319 | A | * | 8/1991 | Glass et al. ................... 96/176 |
| 5,149,411 | A | | 9/1992 | Castle |
| 5,199,362 | A | | 4/1993 | Carter |
| 5,395,408 | A | | 3/1995 | Zeritis |

FOREIGN PATENT DOCUMENTS

| JP | 56087416 A | * | 7/1981 |
| JP | 57078925 A | * | 5/1982 |
| JP | 10156125 A | * | 6/1998 |
| WO | WO 00/43108 A1 | * | 7/2000 |

* cited by examiner

Primary Examiner—Frank M. Lawrence
(74) Attorney, Agent, or Firm—Leander F. Aulisio

(57) ABSTRACT

A process for purifying exhaust gases using a bubble generation device is disclosed.

13 Claims, 4 Drawing Sheets

PROCESS FOR PURIFYING EXHAUST GASES BY EMPLOYING A BUBBLE GENERATOR

This is a non-provisional patent application based on the provisional patent application Ser. No. 60/358,516, filed on Feb. 22, 2002.

BACKGROUND OF THE INVENTION

The present invention relates to a process for purifying exhaust gases from combustion processes and the like. The process comprises bringing exhaust gases into contact with a plurality of bubbles for an extended period of time, thus allowing scrubbing activity to take place.

The present invention also relates to an apparatus for such a process, the apparatus comprising a means for delivering exhaust gas to a bubble generator, a means of generating a plurality of bubbles, a means of conducting the thus formed bubbles to a settling tank, a means for removing impurities from the settling tank, and a means for releasing the purified gas to the atmosphere.

The process of the present invention can be described as a wet scrubbing process. Wet scrubbers employ water to clean or scrub pollutants from the air. One example of wet scrubbing technology is the use of wet scrubbers to clean smoke and other pollutants from coke plant exhaust gases. Sometimes additives are present in the water to neutralize acidity and eliminate sulfur oxides. Lime is an example of such an additive.

One problem with wet scrubbers presently employed is that the contact time between polluted air and scrubbing liquid is severely limited. Pollutants are not fully removed from the exhaust gases, resulting in return of many undesirable chemicals to the atmosphere. The present process allows for extended contact time so that all pollutants are substantially eliminated from the exhaust gases, separated from the bubble generating solution and recovered. Recovered pollutants can be recycled into useful products, or sent to proper disposal units.

The problem of cleaning contaminated air is ubiquitous. Examples of air containing chemical and/or biological pollutants are: combustion engines, power plants, garbage incinerators, coke plants, quarries, smoke stacks, flue pipes, fireplaces, clothes dryers, sewage treatment plants, and composting facilities.

U.S. Pat. No. 5,395,408 (Zeritis), filed on Oct. 12, 1993, discloses a chimney smoke scrubber which can be secured atop a chimney or flue pipe of a combustion unit. The scrubber contains a blower for drawing out the smoke and combustion gases from an enclosure, and delivering the smoke and gases under pressure to a scrubber chamber. The scrubber chamber contains an aqueous solution.

U.S. Pat. No. 5,199,362 (Carter), filed Nov. 27, 1991, relates to a pollution control system for industrial burners. The system removes harmful gases and particulates from industrial smoke streams. The smoke passes through fibrous filters and then through a liquid storage tank. The smoke then bubbles up through the liquid and reaches the surface.

U.S. Pat. No. 5,149,411 (Castle), filed Dec. 24, 1991, discloses a toxic fume scrubbing apparatus. Toxic bubbles are captured, scrubbed, and vented to a holding tank.

U.S. Pat. No. 4,393,815 (Pedersen et al), filed Aug. 15, 1980, discloses a heating plant with a smoke trap for purifying flue gas. The flue gas is drawn through a pipe and forced to bubble through a washing liquid.

U.S. Pat. No. 4,155,977 (Baker), filed Aug. 11, 1977, relates to a Pollution Control Device for an electric power generating plant. Smoke is carried from a furnace into a body of water which is contained within an enclosed concrete tank. A stainless steel grill is positioned within the tank to break up air bubbles and entrap solid particles.

None of the prior art methods hold the pollutant inside the bubble itself for an extended period of time.

SUMMARY OF THE INVENTION

It is a primary object to the present invention to permit the continuous purification of polluted air by contact with large quantities of relatively uniform bubbles for an extended period of time.

Another object of the invention is to provide an apparatus for conducting the purification of contaminated air. The apparatus provides a means for agitating a surfactant solution to produce a relatively large amount of bubbles.

These and other objects of the invention are achieved in general by providing a means for supplying a liquid surfactant solution; means for supplying a contaminated air; means for mixing the liquid surfactant solution and the contaminated air to form a liquid dispersion of relatively large gas bubbles; and means for receiving the gas bubbles into a settling tank.

The apparatus can be an add-on pollution control device. An already existing pollution control system can thus be upgraded by simply combining with the present apparatus, which is compatible with many systems such as ozonizers and ultraviolet light purification devices.

The present method also includes the step of recycling the spent liquid surfactant solution once the pollutants are removed.

DETAILED DESCRIPTION OF THE PREFERRED EMBODIMENTS

Figure 2:
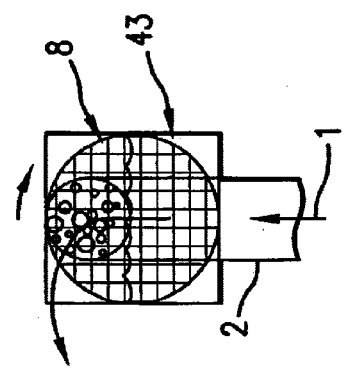
FIG. 2 is a frontal view of a purification system having a rotatable mesh screen, and a container for an aqueous solution of surfactant.

The process of the present invention includes the steps of locating a source of polluted air, directing the polluted air by means of a conduit or the like to a bubble generator, adding a liquid surfactant and water to the bubble generator, generating a large amount of bubbles in the bubble generator by mixing or the like, contacting the polluted air with the bubbles, and removing the bubbles to a settling tank. The polluted air can be directed to the bubble generator by means of a series of fans or pumps or a combination thereof. A thermoelectric generator located near the hot exhaust pipe or source of pollutant can be employed. In an alternative method, a steam-powered generator can be employed to operate the fans and/or pumps.

The source of polluted air can be a residential or commercial combustion unit, manufacturing unit, treatment unit and the like. Polluted air can be captured from combustion engines, power plants, garbage incinerators, coke plants, quarries, smoke stacks, flue pipes, fireplaces, clothes dryers, sewage treatment plants, composting facilities, bathroom facilities, mortuaries, chemical laboratories, restaurants and other areas that generate gases that foul the atmosphere.

The polluted air can be directed to the pollution control device of the present invention by means of a pipe or conduit which is in direct contact with a receiving unit of the pollution control device. In a preferred embodiment, the polluted air is contacted with a heat exchange unit, either direct or indirect, which reduces the temperature of the air for entry into the pollution control device. A spray nozzle is one example of the type of heat exchanger that can be employed. Also, recycled gas from the pollution control device can be employed to cool the incoming polluted air. A humidifier can also be employed in conjunction with the heat exchange unit.

The polluted air can be moved through the pipe or conduit by means of a series of fans, as stated above. A pump or a series of pumps can be employed as a means of moving the air through the pipe or conduit. A venturi or jet can also be employed to rapidly eject the air into the surfactant solution, thus causing bubble formation.

A means of directing water from a water supply storage unit and directing surfactant from a surfactant storage unit is also needed. Two separate means can be employed, one for the water and one for the surfactant. Or the water and surfactant can be pre-mixed and one means of directing the mixture to the pollution control device can be employed.

Surfactants employed in the present invention are selected from the group consisting of anionic surfactants, cationic surfactants, nonionic surfactants, and amphoteric surfactants. Surfactants can be naturally occurring, e.g. seaweed and other natural products; or the surfactants can be synthetic, i.e. synthetic detergents (syndents). Preferred surfactants are salts of long chain fatty acids. Waste surfactants from industrial plants can also be employed.

Other ingredients that can be added to the water along with the surfactant are rinse agents, alkaline builders, stabilizing clays, polymeric additives, lime or hydrated lime, and the like. Storage units for these ingredients can be erected near the site of the pollution control device.

The amount of surfactant that is added to the water will depend on the type of surfactant or mixture of surfactants, the temperature at which the bubble formation will occur, the type of bubble forming device that will be employed and the type of settling tank employed.

A bubble generator receives the water, the surfactant or mixture of surfactants, and the polluted air to obtain a bubble forming combination. The combination of water, air and surfactant is then agitated to produce a relatively large number of stable bubbles. In an alternative embodiment, the bubbles can be contacted with an electrostatic charge to give an electrostatic precipitation product wherein pollutants are then drawn to the walls of the bubbles.

The bubble generator allows for the formation of relatively stable bubbles which allows air and pollutants to be entrapped within a film or membrane which is liquid. Scrubbing activity continues for a substantial period of time and in a continuous fashion. The hydrophobic part of the surfactant molecule can contribute to the scrubbing activity by attaching to pollutants. Thus pollutants can be held within the bubbles themselves.

The bubble generator can be any type of device or method that can generate bubbles from a mixture of water, air and surfactant. Methods include agitating the mixture, adjusting the pressure of the environment and the like. In a preferred embodiment, the bubble generator is a member selected from the group consisting of a distribution grating, a spray nozzle, a rotating disk, a cap or stopper which forces the air through a narrow space, a cyclone, a wiper, a bubble column, and a drip line. Each of these designs can include a means for recirculating the aqueous surfactant solution. Also each of these designs can also be an add-on to already existing pollution control systems.

In a preferred embodiment of the invention, an aqueous foam of bubbles is generated by spraying a foam formulation (water and surfactant) evenly over a mesh screen. Air is passed through the mesh screen at a controlled rate. Bubbles formed at the surface of the mesh screen are ejected from the screen surface by the force of the gas flow. Bubbles of desired characteristics can be obtained by variation of the flow rate of the foam formulation, the size of the nozzle, the spray pattern, the screen mesh size, and the flow rate of the air.

The figures represent various examples of the pollution control device as envisioned in this invention.

Figure 1:
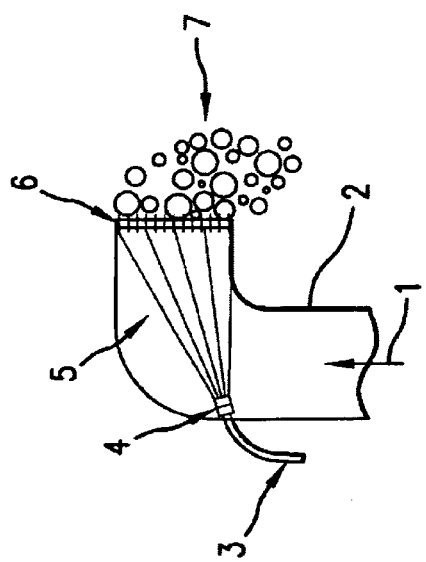
FIG. 1 is a side view of a purification system wherein a spray nozzle is employed.

FIG. 1 shows a side view of a pollution control device wherein a spray nozzle is employed for recirculation of the surfactant solution. Polluted air (1) flows through a conduit (2) to a bubble generator comprising a settling tank (not shown), a conduit (3) for withdrawing used surfactant solution from the settling tank to the spray nozzle (4), a spray (5) of aqueous surfactant and enveloped air, a distribution grating (6), and bubbles (7). The bubbles are forced away from the bubble generator and collected in a settling tank where the scrubbing of the polluted air continues.

FIG. 2 shows a front view of a pollution control device. Contaminated air (1) enters a conduit (2) and is directed to a bubble generator which comprises a container (43) for aqueous surfactant solution. Bubbles form at a rotating mesh screen (8) and are transported to a settling tank (not shown).

Figure 3:
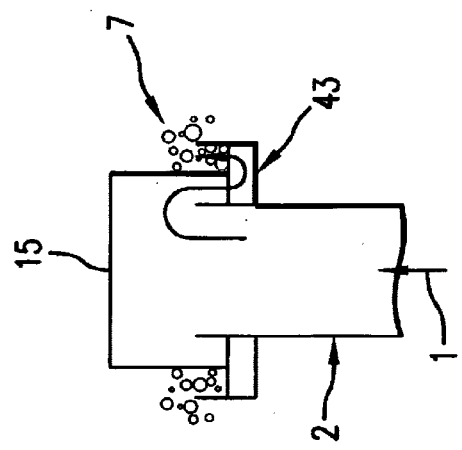
FIG. 3 is a side view of a pollution control system wherein a cap for redirecting airflow is employed, forcing gasses through a surfactant solution, forming bubbles.

FIG. 3 relates to a side view of a pollution control device wherein a tortuous path is created for the flow of a mixture of water, air and surfactant. Polluted air (1) enters a conduit (2) and is directed to a bubble generator comprising a container (43) for the aqueous surfactant. The flow of air is directed by means of cap (15) to the aqueous surfactant where bubbles (7) are generated. The bubbles flow over the side of the container (43) and are collected in a settling tank (not shown).

Figure 4:
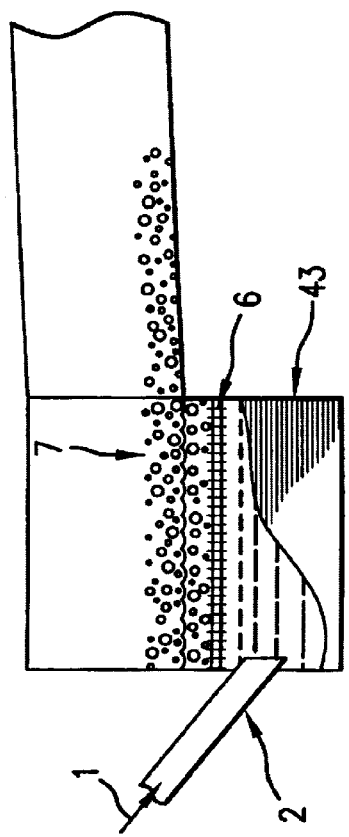
FIG. 4 is a side view of a pollution control system which is similar to an impingement scrubber design.

FIG. 4 shows a pollution control device wherein an impingement scrubber is employed. Polluted air (1) flows through pipe (2) into a container (43) filled with an aqueous composition containing surfactant. The air bubbles up through the aqueous composition and passes through a mesh screen or grating (6) and thus forms bubbles (7) at the surface of the aqueous composition. The bubbles are transported from the bubble generator to a settling tank (not shown).

Figure 5:
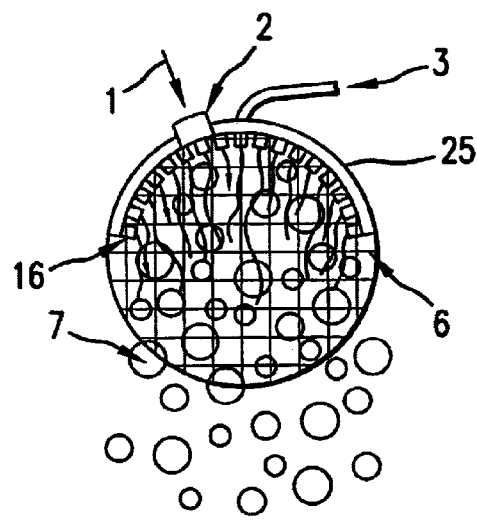
FIG. 5 is a frontal view of a purification system wherein a drip line is employed for distribution of an aqueous solution of surfactant.

FIG. 5 shows a front view of a pollution control device wherein a drip line is employed. Polluted air (1) flows through a pipe (2) and into a bubble generator system comprising a conduit (3), a mesh screen or grating (6), and a hemispherical delivery device (25) containing a multiplicity of openings (16). The delivery device can contain up to hundreds of thousands of openings. Aqueous surfactant solution flows through the conduit (3) and into the delivery device (25) where the fluid drips down through the openings (16). Bubbles (7) are formed when air contacts the dripping solution and forced through the grating (6). The bubbles are collected and removed to a settling tank where further scrubbing activity takes place.

Figure 6:
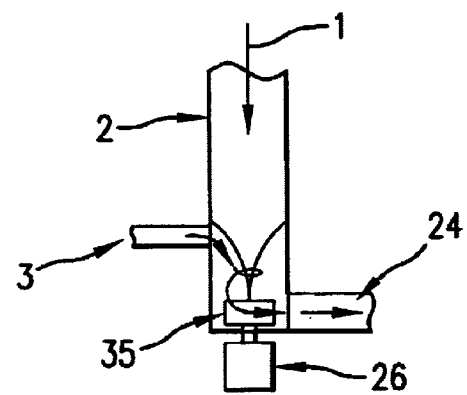
FIG. 6 is a side view of a purification system wherein a cyclone design is employed for creating bubbles from an aqueous solution of surfactant.

FIG. 6 shows a side view of a pollution control device wherein a cyclonic system is employed. Polluted air (1) enters conduit (2) and is conducted to a bubble generator comprising a mixing turbine or blade (35) which is energized by electric motor (26). An aqueous solution of surfactant flows into the bubble generator by means of conduit (3). Bubbles are withdrawn from the bubble generator via conduit (24) and transported to a settling tank (not shown).

Figure 7:
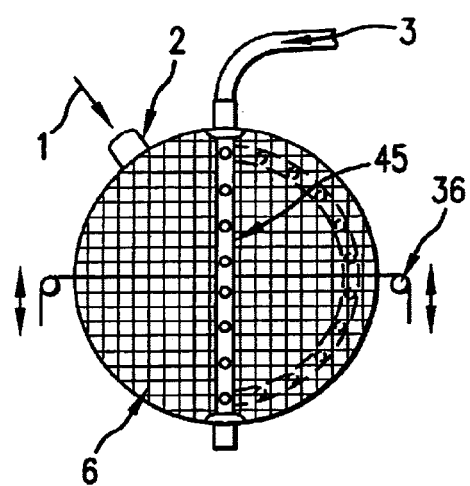
FIG. 7 is a frontal view of a purification system wherein a wiper blade is employed.

FIG. 7 shows a front view of a pollution control device wherein a wiper blade system is employed. A stream of polluted air (1) enters a pipe (2) and is directed to a bubble generator comprising a wiper blade (45), a pulley system (36) and a wire mesh screen or grating (6). An aqueous solution of surfactant enters the bubble chamber via conduit (3) which is directly connected to wiper blade (45).

Figure 8:
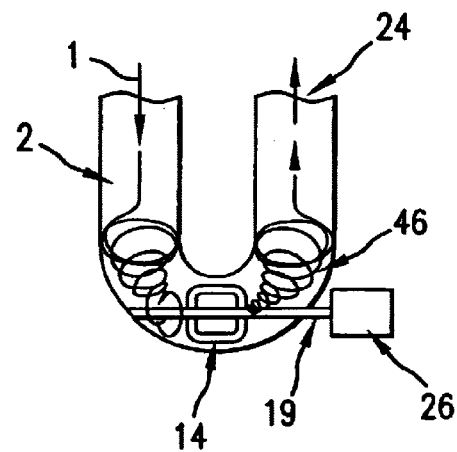
FIG. 8 is a side view of a pollution control device which employs a double-sided cyclone scrubber and a rotating propeller.

FIG. 8 shows a side view of a pollution control device employing a double-sided cyclone system. Contaminated gas (1) enters a conduit (2) and is conducted to a bubble generating region containing a propeller (14) on a rotating axis (19); said axis being attached to an electric motor (26). The bubble generating region contains an aqueous solution of surfactant. When the motor is turned on, the axis rotates and causes the propeller to operate in such a fashion as to cause a double-cyclonic formation (46). Bubbles are generated in the cyclonic action, and then transferred via conduit (24) to a settling tank (not shown).

Figure 9:
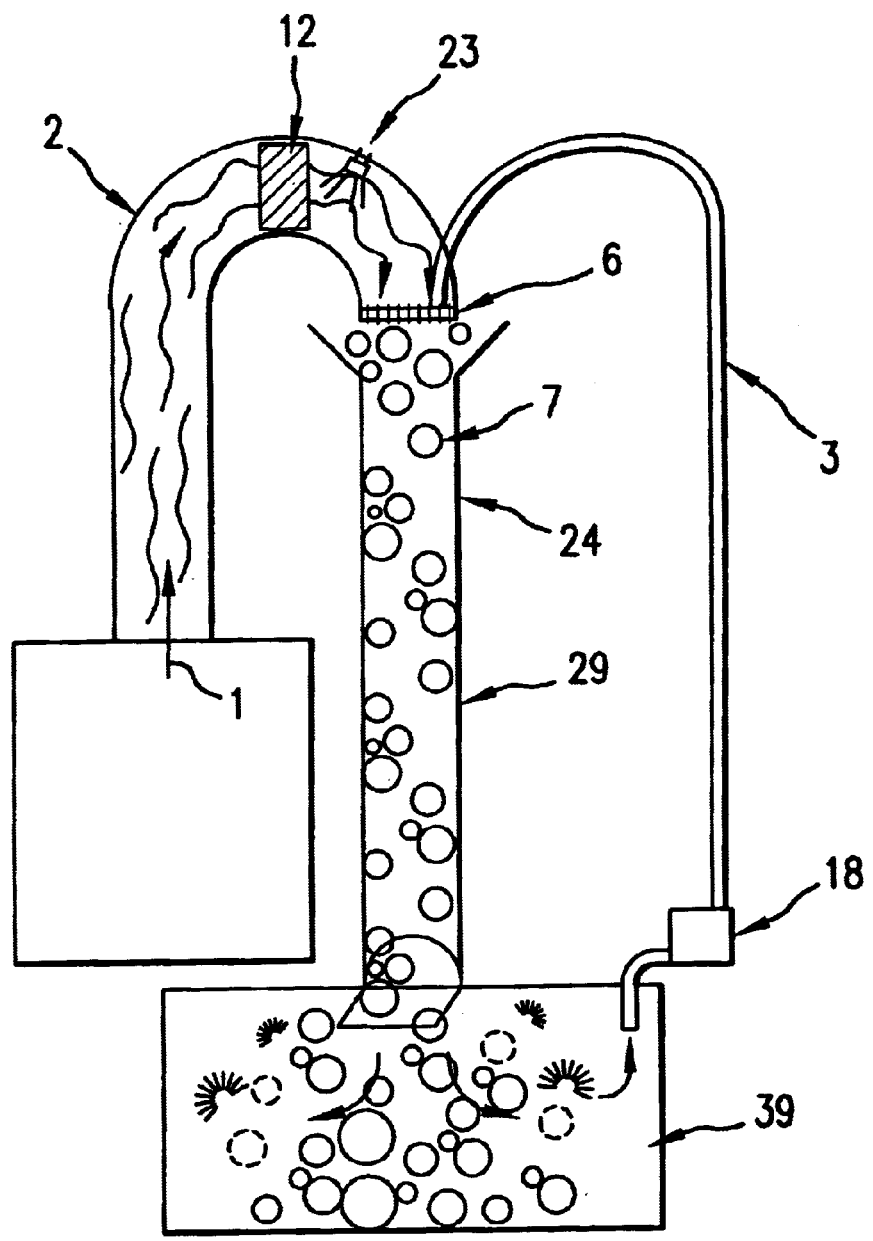
FIG. 9 is a side view of a pollution control device having a means of recirculating a used aqueous solution of surfactant.

FIG. 9 shows a side view of a preferred embodiment of the pollution control device of the present invention. A stream of polluted air (1) is captured in a pipe (2) and flows past a fan (12). The fan pushes the polluted stream of air to a series of humidity-adding devices, such as misters (23) and into a mesh screen or grating (6). At the grating, the air is contacted with an aqueous solution of surfactant. As the mixture of air and surfactant is forced through the grating, a large number of bubbles (7) are formed. The bubbles enter a transport conduit (24) and are carried to a settling unit (29). Although the settling unit is pictured as closed, it can also be an open unit. Recyclable portion of the aqueous surfactant is collected in a collection unit (39) and recycled to the grating (6) by means of a pump (18) and conduit (3). As an alternative embodiment, the bubble generator can be an apparatus other than a grating device (6), such as a cyclonic system, a venturi jet, a spray nozzle, a rotating distribution device and the like. Thus, the grating (6) is merely representative of any bubble generating device. If a grating (6) is employed, it can also be modified to be a movable type grating for changing the size of the apertures, thus allowing for the formation of different sizes of bubbles.

Figure 10:
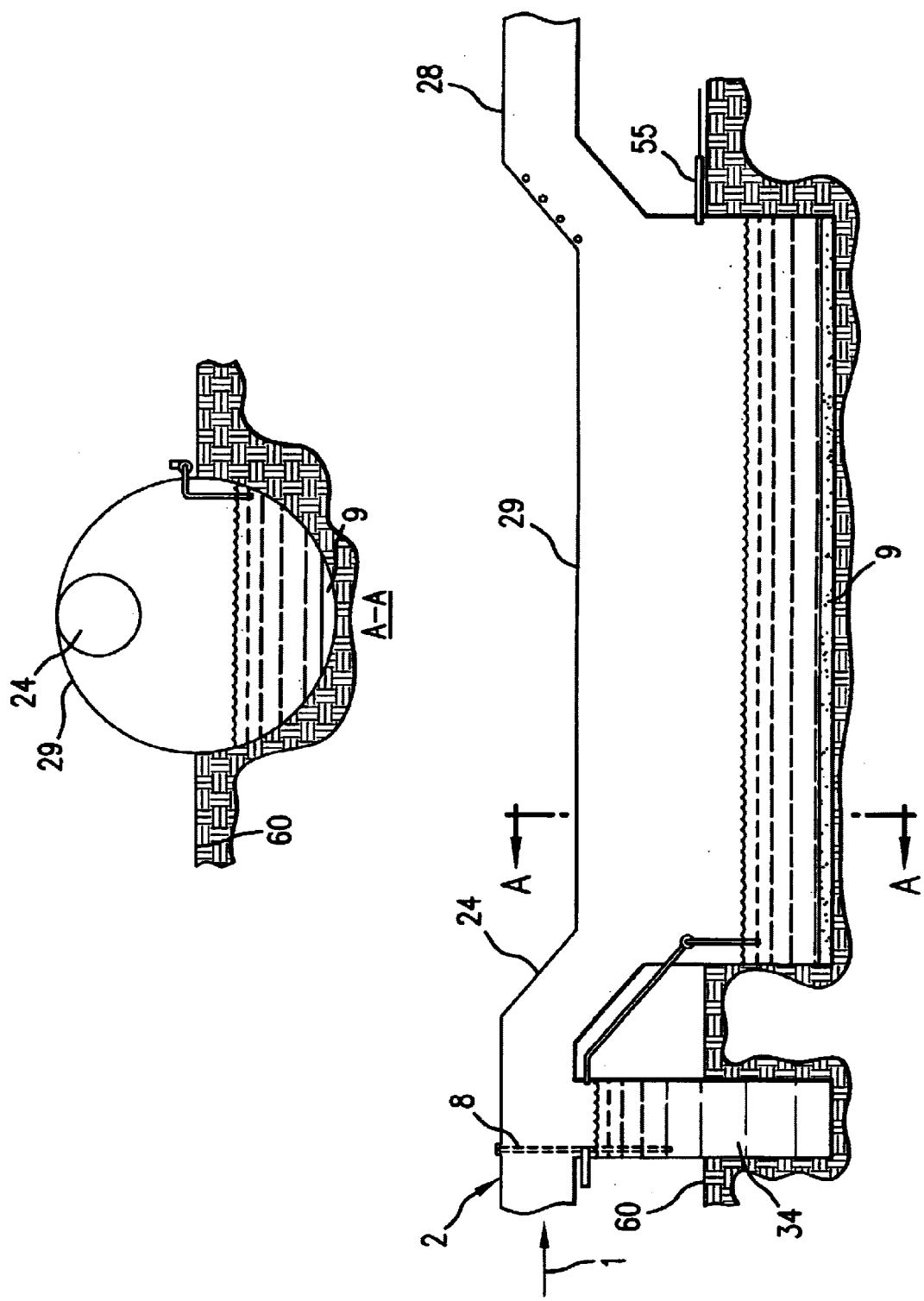
FIG. 10 is a side view and a sectional view of a pollution control device having a rotating perforated wheel for distributing a flow of contaminated air into an aqueous solution of surfactant.

FIG. 10 shows a side view and a sectional view of a pollution control device wherein a rotating perforated wheel (8) is employed to form the bubbles from a mixture of air, water and surfactant. The side view shows a stream of polluted air (1) which enters a conduit (2) and contracts an aqueous solution of surfactant from storage tank (34) at the interface of a perforated disk (8) which is rotating. Bubbles which are formed are directed to conduit (24) and flow to a settling tank (29) where the scrubbing action of the bubbles on the air takes place. Purified air leaves the settling tank via pipe (55). A recycle system (not shown) can bring the excess solution back to the solution storage tank (34). Sludge (9) formed at the bottom of the settling tank can be periodically removed by means of a filter or sieve. Any separation method known to those skilled in the art can be employed to remove contaminants from the bubbles. The settling tank itself can be located above the ground, at ground level (60) or below the ground. Also, the settling tank can be closed or open. To prevent recycle of pollutants, a filter or screen or osmotic membrane or the like can be placed before the exit pipe (55). As an alternative embodiment, the purified air in conduit (28) can be recycled to the bubble generator, which includes the rotating disk, for further scrubbing.

The sectional view of FIG. 10 relates to the view along the AA line of demarcation of the pollution control device.

Excess bubbles residing in the storage tank can be removed as by cracking or popping. The bubbles can be cracked or popped by employing any number of devices and methods, such as by freezing, spraying with water, heating with a flame, heating with a metal grid, cooling with a metal grid or mechanical crushing. Any destruction means known to those skilled in the art can be employed to eliminate the excess bubbles from the settling tank.

All of the various means for generating bubbles according to the method of this invention can be employed in combination, if so desired. For example, a mixture of water, surfactant and air can be passed to a distribution grating via a spray nozzle to produce an aqueous solution of bubbles, which aqueous solution is then directed to a cyclonic device with a rotating propeller.

Also, multiple settling tanks can be employed, if so desired. Bubbles, or surfactant solution, or both from a primary settling tank can be withdrawn and added to a series of secondary settling tanks. This arrangement allows for easier removal of pollutants, as one secondary tank can be cleaned while other secondary tanks (or the primary tank alone) are operating.

It should be understood that the forgoing description of the invention is illustrative only and the scope on the invention should be determined from the following claims.

I claim:

1. A continuous process for purifying a stream of air from an exhaust pipe comprising the steps of: conducting the stream of air from the exhaust pipe to a conduit which is directly connected to a bubble generator, receiving the stream of air into the bubble generator, maintaining a source of surfactant, maintaining a source of water, conducting the surfactant to the bubble generator, conducting the water to the bubble generator, operating the bubble generator in such a manner as to form a plurality of bubbles and conducting the bubbles to a settling tank.

2. A continuous process according to claim 1 wherein the stream of air is obtained from a unit which is a member selected from the group consisting of an industrial factory, a combustion engine, a household heater, a garbage disposal unit, a garbage incinerator, a power plant, a coke plant, a quarry, a fireplace, a clothes dryer, a sewage treatment plant, a wet scrubber, and a composting facility.

3. A continuous process according to claim 1 wherein the bubble generator is a member selected from the group consisting of a spray nozzle and a distribution grating, a perforated rotating wheel, a holding tray and stopper, a drip line, a cyclonic design, a wiper design (the wiper having an internal tube for distributing surfactant), a double-sided cyclonic scrubber, and a bubble column.

4. A continuous process according to claim 1 wherein the conduit which is directly connected to the bubble generator contains a series of pumps or fans to conduct the air stream to the bubble generator.

5. A continuous process according to claim 1 wherein the plurality of bubbles is conducted to the settling tank through a conduit.

6. A continuous process according to claim 5 wherein the conduit contains a series of pumps or fans to conduct the bubbles to the settling tank.

7. A continuous process according to claim 1 wherein the surfactant is a member selected from the group consisting of an anionic surfactant, a cationic surfactant, an amphoteric surfactant, and a nonionic surfactant.

8. A continuous process according to claim 1 further comprising the steps of separating pollutants and impurities from a water and surfactant mixture in the settling tank, and recycling the water and surfactant mixture to the bubble generator.

9. A process for removal of impurities from flue gas comprising the steps of conducting the flue gas to a bubble generator, conducting a mixture of water and surfactant to the bubble generator, generating a plurality of bubbles, contacting the bubbles with an electrostatic charge, and removing the bubbles to a settling tank.

10. A process according to claim 9 further comprising the steps of separating impurities from an aqueous surfactant mixture in the settling tank, and recycling the aqueous surfactant mixture to the bubble generator.

11. A process according to claim 9 further comprising the step of withdrawing a purified flue gas from the settling tank.

12. A process according to claim 10 further comprising the step of withdrawing a purified flue gas from the settling tank.

13. An apparatus for purifying a stream of air from an exhaust pipe comprising: (1) a bubble generator, (2) a means of conducting the stream of air to the bubble generator, (3) a means of conducting a surfactant to the bubble generator, (4) a means of conducting water to the bubble generator, (5) a means of removing bubbles from the bubble generator, (6) a settling tank for receiving the bubbles from the bubble generator, and (7) an electrostatic generator for electrostatic precipitation, wherein the means for removing the bubbles from the bubble generator is operatively connected to the settling tank, and wherein the electrostatic generator is operatively connected to the bubble generator.

* * * * *

UNITED STATES PATENT AND TRADEMARK OFFICE
CERTIFICATE OF CORRECTION

PATENT NO. : 6,966,942 B2 Page 1 of 1
DATED : February 24, 2003
INVENTOR(S) : Alan Hyrum Broadbent It is certified that error appears in the above-identified patent and that said Letters Patent is hereby corrected as shown below:

<u>Title page,</u>
Item [75], Inventor, should read -- Alan Hyrum Broadbent --.

Signed and Sealed this

Thirteenth Day of June, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,966,942 B2 | Page 1 of 1 |
| APPLICATION NO. | : 10/371208 | |
| DATED | : November 22, 2005 | |
| INVENTOR(S) | : Alan Hyrum Broadbent | |

It is certified that error appears in the above-identified patent and that said Letters Patent is hereby corrected as shown below:

Title Page,
Item [75], Inventor, should read -- Alan Hyrum Broadbent --.

This certificate supersedes certificate of correction issued June 13, 2006.

Signed and Sealed this

Twenty-second Day of August, 2006

JON W. DUDAS
*Director of the United States Patent and Trademark Office*